(12) United States Patent
Bealkowski

(10) Patent No.: US 9,015,707 B2
(45) Date of Patent: Apr. 21, 2015

(54) VIRTUAL MACHINE RAPID PROVISIONING SYSTEM

(75) Inventor: Richard Bealkowski, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 12/874,766

(22) Filed: Sep. 2, 2010

(65) Prior Publication Data

US 2012/0060153 A1  Mar. 8, 2012

(51) Int. Cl.
*G06F 9/455* (2006.01)

(52) U.S. Cl.
CPC .. *G06F 9/45558* (2013.01); *G06F 2009/45575* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,367,688 | A * | 11/1994 | Croll | 713/2 |
| 7,849,462 | B2 * | 12/2010 | Traut et al. | 718/1 |
| 7,984,262 | B2 * | 7/2011 | Battista et al. | 711/173 |
| 2006/0053217 | A1 * | 3/2006 | Nagasawa et al. | 709/223 |
| 2009/0083404 | A1 | 3/2009 | Lenzmeier et al. | |
| 2009/0157419 | A1 | 6/2009 | Bursey | |
| 2009/0276771 | A1 | 11/2009 | Nickolov et al. | |
| 2010/0027552 | A1 | 2/2010 | Hill | |
| 2010/0042994 | A1 | 2/2010 | Vasilevsky et al. | |
| 2010/0153482 | A1 | 6/2010 | Kim et al. | |
| 2011/0078680 | A1 * | 3/2011 | Lagergren et al. | 718/1 |

OTHER PUBLICATIONS

McSpirit, Matt, Cool Tools: VHDCopy, VHDCopEE and VMProv, Xtravirt, Feb. 3, 2010.
Mary Jander, Racemi Joins Automation Race, Network Computing, Posted on Mar. 9, 2007, http://www.networkcomputing.com/virtualization/racemi-joins-automation-race.php.

* cited by examiner

*Primary Examiner* — Eric C Wai
(74) *Attorney, Agent, or Firm* — Edward J. Lenart; Mark McBurney; Kennedy Lenart Spraggins LLP

(57) ABSTRACT

A rapid provisioning method for connecting to a cloud, copying blocks of a virtual machine image to the cloud and booting the virtual machine image in the cloud, wherein some aspects of copying the blocks and booting the virtual machine are contemporaneous or overlap. The method may include starting with copying the blocks of the virtual machine and continuing to copy the blocks of the virtual machine image while the virtual machine image boots in the cloud. The method may also include starting with booting the virtual machine in the cloud from the customer computer and continuing to boot while copying the blocks transferred during boot to cloud storage.

18 Claims, 5 Drawing Sheets

VIRTUAL MACHINE RAPID PROVISIONING SYSTEM

BACKGROUND

The present invention relates to cloud computing systems, and more specifically, to systems for provisioning virtual machines in the cloud.

Cloud computing is Internet-based computing, whereby shared resources, software and information are provided to computers and other devices on-demand, like the electricity grid. A common way of implementing a cloud computing service is to employ virtualization on the cloud computers. In a typical scenario of cloud computing the customer provides a virtual machine image and uploads the image to be hosted and run from a cloud computing service.

SUMMARY

According to one embodiment, the present invention includes a rapid provisioning method for connecting to a cloud, copying blocks of a virtual machine image to the cloud and booting the virtual machine image in the cloud, wherein some aspects of copying the blocks and booting the virtual machine are contemporaneous or overlap.

For example, the method may include starting with copying the blocks of the virtual machine and continuing to copy the blocks of the virtual machine image while the virtual machine image boots in the cloud.

As another example, the method may include starting with booting the virtual machine in the cloud from the customer computer and continuing to boot while copying the blocks transferred during boot to cloud storage.

In another embodiment, continuing to copy the virtual machine image includes supplying, on request from the cloud, selected blocks to enable booting of the virtual machine in the cloud. The selected blocks may modify a pre-ordered sequence of blocks for copying the virtual image to the cloud. For example, copying of the selected blocks may be prioritized in order of importance to booting of the virtual machine in the cloud. In another embodiment, the method may include bypassing copying of unnecessary blocks of the virtual machine.

Also, the method may include resuming copying of the blocks of the virtual machine to the cloud in the pre-ordered sequence after the virtual machine completes booting.

The machine image blocks may be encrypted and the cloud may be a virtual private network.

In another embodiment, the rapid provisioning method includes providing storage and processing services in a cloud for blocks of a virtual machine image, redirecting a boot path for the virtual machine from a hypervisor and determining if blocks of the virtual machine image have already been uploaded.

In addition, the method can include communicating a request to a customer computer for blocks not already uploaded and providing the blocks not already uploaded to the hypervisor and to cloud storage. For blocks already uploaded, the method includes communicating a request for those blocks to cloud storage.

In another aspect, the method includes creating a map of blocks of the virtual machine identify blocks in cloud storage or on the customer computer. The copying of blocks may be prioritized depending on the needs of the virtual machine image during booting to the cloud. Unused blocks of the virtual machine may be bypassed by the method.

After rapid provisioning is complete (or almost complete) the control of the virtual machine may be returned to the hypervisor.

DETAILED DESCRIPTION

Figure 1:
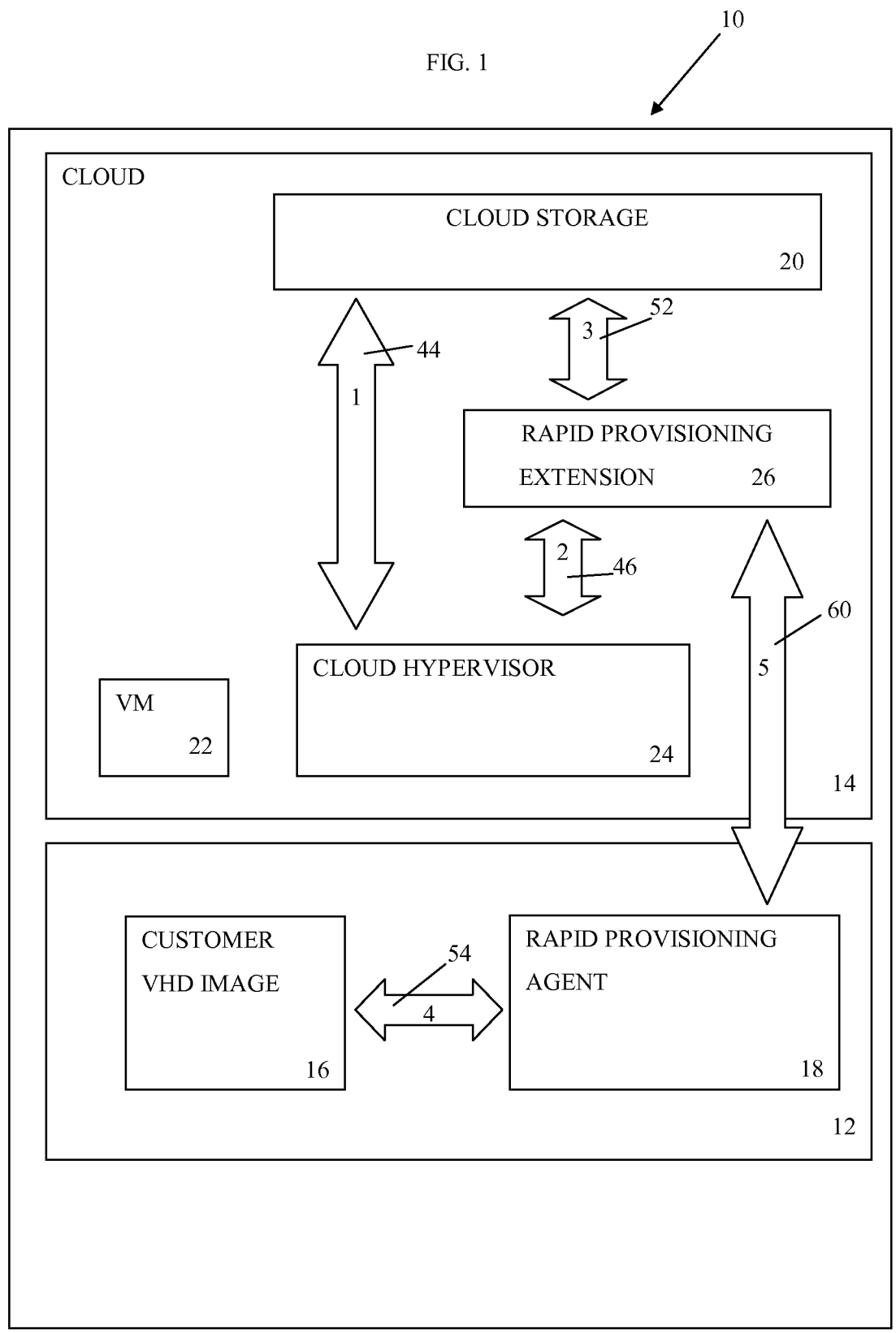
FIG. 1 is a schematics of a cloud provisioning system of one embodiment of the present invention.

With reference now to FIG. 1, embodiments of the present invention include a cloud provisioning system 10 that includes a client computer system 12 connected to a cloud 14. The client computer system includes a virtual hard drive (VHD) image 16 and a rapid provisioning agent 18. The cloud computer system 12 includes storage 20, a virtual machine (VM) 22, a cloud hypervisor 24 and a rapid provisioning extension 26. Generally, the rapid provisioning agent 18 and the rapid provisioning extension 26 are configured to intervene in, and coordinate, the process of mounting and booting the VHD image in the cloud 14 to improve speed and efficiency. For example, some embodiments of the present invention combine uploading and booting of the VHD image 16 into the cloud 14 into a single integrated and coordinated step.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) maybe utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIG. 1, the VM 22 is a software implementation of a machine and/or computer that executes programs like a dedicated physical machine or computer. Data and instructions for construction of the VM 22 in the form of the VHD image 16 are abstracted from the users, who no longer have need for expertise in, or control over, the technology infrastructure in the cloud 14 that supports them.

Although it has been observed by the inventor that uploading to the internet or other cloud 14 is a generally an effective process, the VHD image 16 may be multiple gigabytes in size and thus may take a long time to upload. The problem is that there is a likely significant time delay between beginning the upload process of a VHD image 16 and when the upload completes. Advantageously, some embodiments of the present invention combine uploading and booting of the VHD image 16 into the cloud 14 into a single integrated and coordinated step to accelerate the process of provisioning a VM.

The client computer system 12 can be any mixture of hardware, software and firmware either centrally located (e.g., on a single desktop or laptop) or distributed in its own network, such as a local-area-network within a firm. Regardless of how the client computer system 12 is constructed, it preferably includes the details needed to be communicated in the VHD image 16 through to the cloud 14 to inform creation of the VM 22.

The cloud 14 is preferably any centralized or distributed network of computing resources accessible to the client computer system 12 for supporting operation of the VM 22. Other aspects of distributed computing and network systems are described elsewhere herein.

The storage 20 resides on the cloud 14 and is preferably capable of holding the VHD image 16 and communicating with the cloud hypervisor 24 to boot the VHD image using processing resources of the cloud. As noted above and below, the storage 20 need not include any particular dedicated technology and may be centralized or distributed.

The hypervisor 24, also called virtual machine monitor (VMM), is configured to create virtualization by allowing multiple operating systems to run concurrently on a host computer. The hypervisor 24 is configured to present the guest operating systems with a virtual platform and monitors the execution of the guest operating systems. Thus, multiple operating systems, including multiple instances of the same operating system, can share hardware resources. In some embodiments of the present invention, those resources are in the cloud 14.

The rapid provisioning agent 18 and rapid provisioning extension 26 are configured to implement the various operations and processes described in more detail below. Although in the illustrated embodiments each of the operations and processes are described as being subdivided between the agent 18 and extension 26, with the agent 18 being resident on the client computer system 12 and the extension 26 on the cloud 14, it should be noted that these functions and processes can be shifted somewhat between the client and cloud. Generally, then, from one perspective the agent 18 and extension 26 could be viewed as an integrated system on a portion of the client and the cloud and thus residing on its own cloud.

The rapid provisioning agent 18 may also include data encryption or virtual private network (VPN) capabilities.

Figure 2:
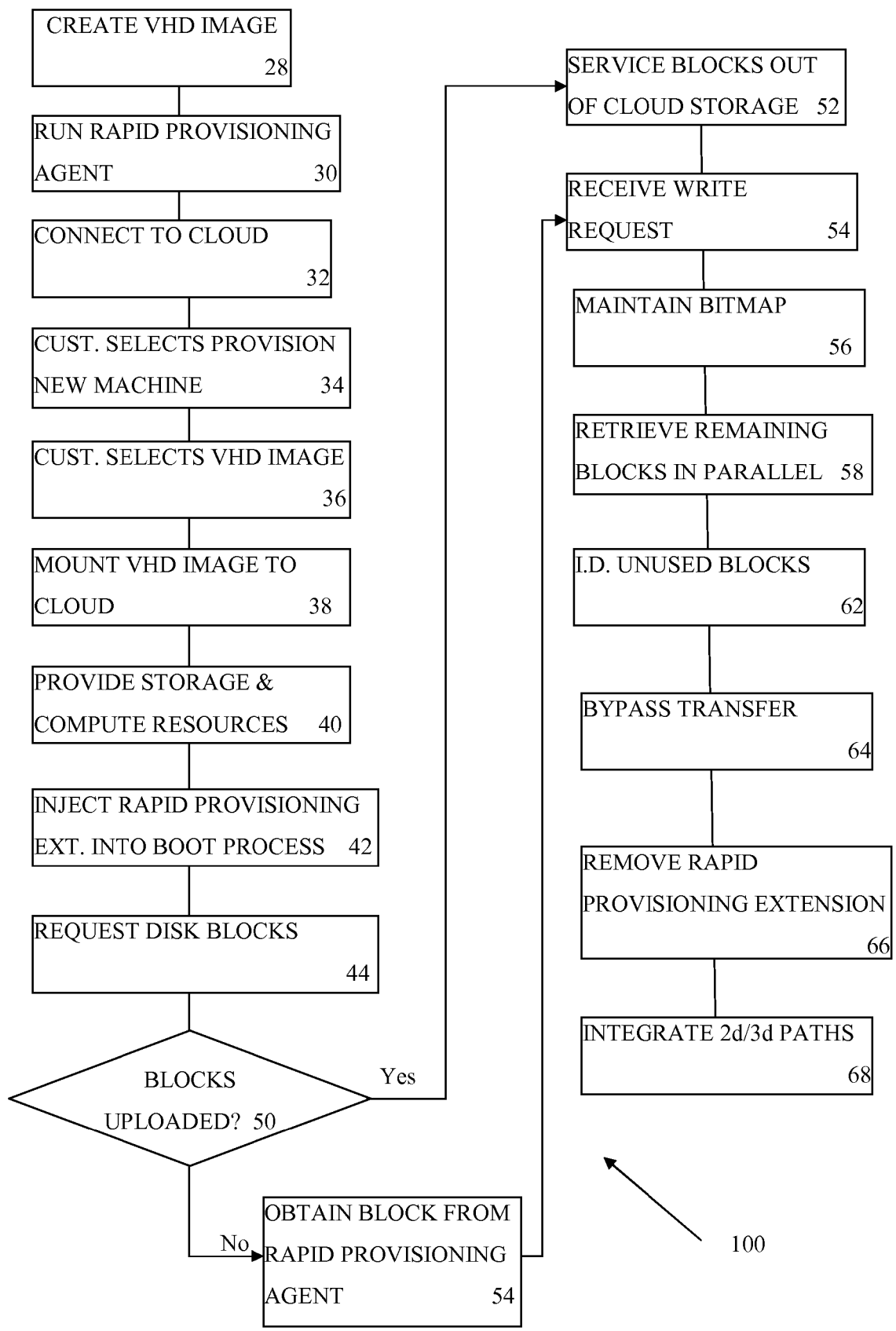
FIG. 2 is a schematic of a cloud provisioning process of another embodiment of the present invention implemented on a client computer system.

In another embodiment, the cloud provisioning system includes a process for mounting and booting a virtual machine 22, as shown in FIG. 2. A customer creates 28 the VHD image. The rapid provisioning agent 18 is run 30 on the client computer system 12. The rapid provisioning agent 18 connects 32 to the cloud 14 on behalf of the customer using the customer's account credentials. The customer selects 34 to provision a new machine in the cloud 14. The customer then selects 36 the VHD image to be implemented in the cloud 14. The rapid provisioning agent 18 then mounts 38 the VHD image 16 to the cloud 14. As mentioned above, it can perform this process (and other processes) using data encryption or its own VPN capabilities.

In response to the communications with the rapid provisioning agent 18, the cloud 14 provides 40 storage and compute resources based on the customer's request and purchase.

In another step, the rapid provisioning extension 26 is injected 42 into the boot process. For instance, the boot path is redirected from a first path 44 to a second path 46, as is also shown in FIG. 1.

The VM 22 running on the hypervisor 24 begins the boot process by requesting 44 disk blocks. The rapid provisioning extension 26 determines 50 if the blocks have already been uploaded or need to be uploaded. If the blocks are already uploaded, then the requested blocks are serviced ($3^{rd}$ path 52) out of cloud storage 20. If the blocks have not been uploaded, then the blocks are obtained ($4^{th}$ path 54) from the rapid provisioning agent 18 and provided to the hypervisor 24.

If the rapid provisioning extension receives 54 a write request, the write goes to cloud storage 20. Meanwhile, the rapid provisioning extension 26 maintains 56 a bitmap corresponding to disk blocks to facilitate determination 50 if the blocks are to be serviced from cloud storage 20 or from the rapid provisioning agent 28. Thus, the most important blocks involved in booting and rendering the compute service operational are transferred first.

The remaining blocks are retrieved 58 by the rapid provisioning extension 26 in parallel to other operations, thus maximizing the bandwidth over the fifth path 60. In addition, the rapid provisioning agent 18 and extension 26 can identify 62 currently unused disk blocks not yet used by the file system and bypass 64 unnecessary transfer of those blocks.

Once all the (necessary) blocks have been uploaded by the rapid provisioning extension 26, it is removed 66 from the $2^{nd}$ and $3^{rd}$ paths 46, 52 for the VM 22. The $2^{nd}$ and $3^{rd}$ paths integrate 68 and subsequent requests flow directly from the hypervisor 24 to cloud storage 20 via the first path 44.

An advantage of the aforedescribed system is that a new VM 22 can be up and operational in parallel with the ongoing up-load transfer of less essential data. This less essential data can be purposefully delayed based on the time of day, transfer costs or bandwidth constraints. This is balanced against wanting to still complete the transfer as quick as reasonably possible.

In another embodiment, the cloud provisioning system 10 can adapt to the loss or degradation of a transfer connection by sending the VM 22 into hibernation. The rapid provisioning agent 18 is configured to resume transferring blocks immediately after reconnection, again maximizing available bandwidth.

Figure 3:
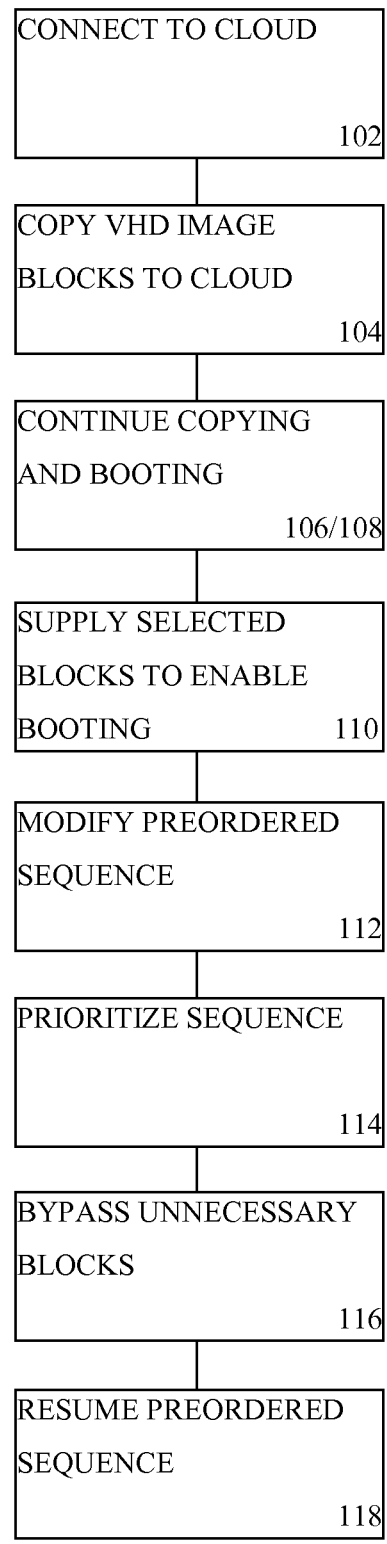
FIG. 3 is a schematic of a cloud provisioning process of another embodiment of the present invention implemented in a cloud computer system.

In another embodiment, as shown in FIG. 3, the present invention includes a rapid provisioning process 100. Steps of this process include connecting 102 to the cloud 14. Blocks of the VHD image 16 are copied 104 to the cloud 14. Copying of the blocks is continued 106 while the VM 22 boots 108 into the cloud.

Continuing 106 to copy may include supplying 110, on request from the cloud 14, selected blocks to enable booting 108 of the VHD image 16. Also, a pre-ordered sequence of copying the blocks of the VHD image 16 may be modified 112. For example, the modification might include prioritizing 114, in order of importance to booting, the blocks in the sequence. Also, the modification might include bypassing 116 unnecessary blocks of the VHD image 16.

The process 100 may also include resuming 118 copying of the blocks of the VHD image 16 in the pre-ordered sequence after the booting 108 is completed.

In another embodiment, the rapid provisioning process may include supporting booting the VM 22 in the cloud from the client computer system 12 and copying the blocks transferred during boot to cloud storage 20.

Figure 4:
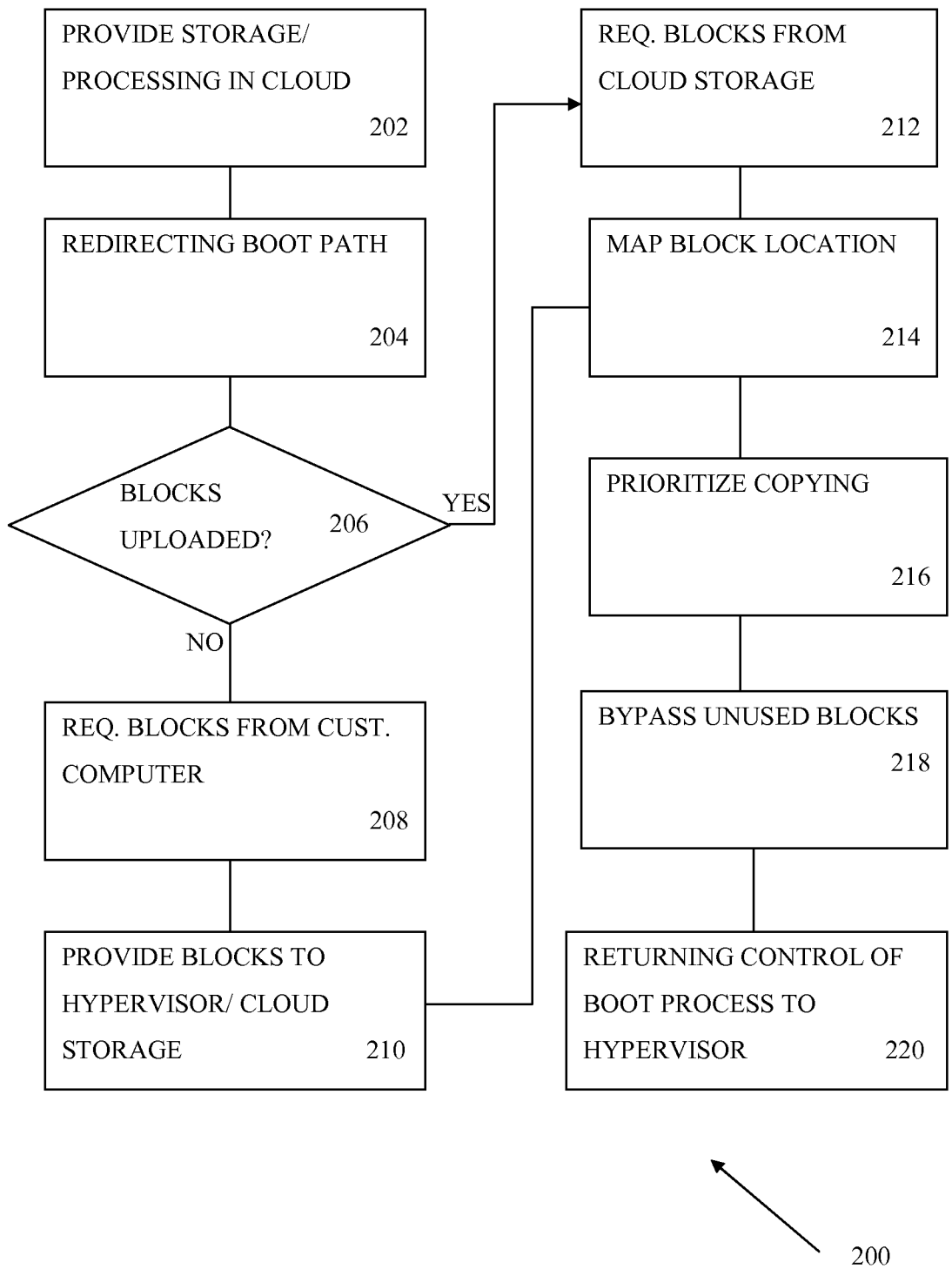
FIG. 4 is another embodiment of a cloud provisioning system of the present invention.

In yet another embodiment, as shown in FIG. 4, the present invention includes a rapid provisioning process 200 including providing 202 storage and processing services in the cloud 14 for blocks of the VHD image 16. Redirecting 204 a boot path for the VHD image 16 from the hypervisor 24 is another step. And, the process includes determining 206 if the blocks of the VHD image 16 have already been uploaded.

In another step, the process 200 may include communicating 208 a request to a customer computer for blocks that have not already uploaded and providing 210 the blocks not already uploaded to the hypervisor 24 and to cloud storage 20. Also, included may be communicating 212 a request to cloud storage 20 for blocks already uploaded thereto. Mapping 214 of the blocks may also be performed to identify blocks in cloud storage or on the customer computer.

Also, the process 200 may include prioritizing 216 copying of the blocks depending upon the needs of the VHD image 16 during booting in the cloud 14. Bypassing 218 of unused blocks of the VHD image 16 is also an option.

After one or more of the above-described steps, the process 200 can perform the step of returning 220 control of the boot process and operation of the VM 22 to the hypervisor 24.

Figure 5:
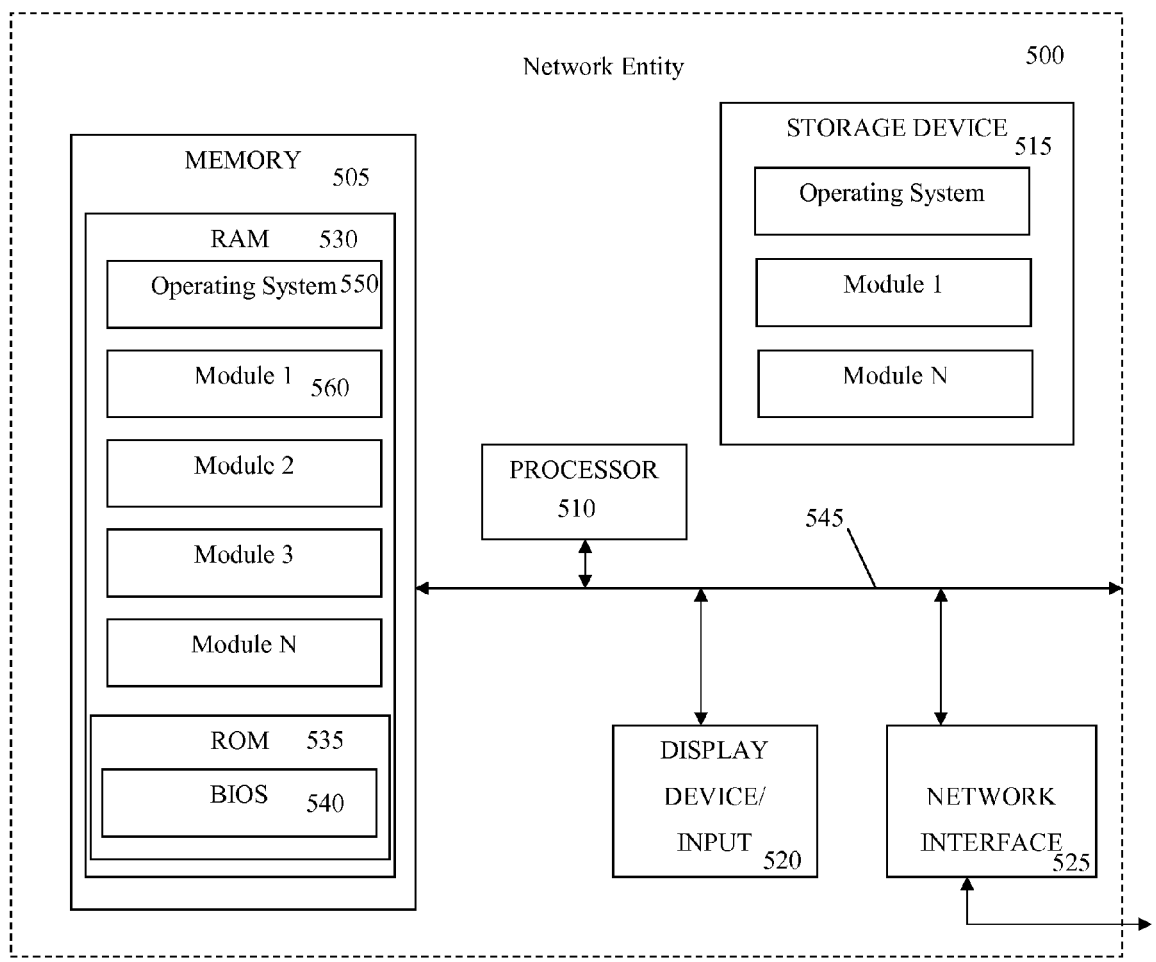
FIG. 5 is another embodiment of a cloud provisioning system of the present invention.

Referring now to FIG. 5, a schematic diagram of a central server 500, or similar network entity, configured to implement a rapid provisioning system, according to one embodiment of the invention, is provided. As used herein, the designation "central" merely serves to describe the common functionality the server provides for multiple clients or other computing devices and does not require or infer any centralized positioning of the server relative to other computing devices. As may be understood from FIG. 5, in this embodiment, the central server 500 may include a processor 510 that communicates with other elements within the central server 500 via a system interface or bus 545. Also included in the central server 500 may be a display device/input device 520 for receiving and displaying data. This display device/input device 520 may be, for example, a keyboard or pointing device that is used in combination with a monitor. The central server 500 may further include memory 505, which may include both read only memory (ROM) 535 and random access memory (RAM) 530. The server's ROM 535 may be used to store a basic input/output system 540 (BIOS), containing the basic routines that help to transfer information across the one or more networks.

In addition, the central server 500 may include at least one storage device 515, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 515 may be connected to the system bus 545 by an appropriate interface. The storage devices 515 and their associated computer-readable media may provide non-volatile storage for a central server. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 530. Such program modules may include an operating system 550 and a plurality of one or more (N) modules 560. The modules 560 may control certain aspects of the operation of the central server 500, with the assistance of the processor 510 and the operating system 550. For example, the modules may perform the functions described above and illustrated by the figures and other materials disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A rapid provisioning method comprising:
    connecting to a cloud;
    initiating copying blocks of a virtual machine image to the cloud, wherein the blocks are copied in a particular transmission order;
    initiating booting of the virtual machine image in the cloud; and
    in response to initiating booting of the virtual machine image in the cloud, continuing to copy blocks of the virtual machine image while the virtual machine image boots in the cloud, modifying the particular transmission order including arranging the blocks in a modified order based on each block's importance to the booting of the virtual machine image, and resuming copying the blocks of the virtual machine image to the cloud in the pre-modified particular transmission order after the virtual machine image completes booting.

2. The rapid provisioning method of claim 1, further comprising bypassing copying of unnecessary blocks of the virtual machine image.

3. The rapid provisioning method of claim 1, further comprising encrypting the blocks of the machine image.

4. The rapid provisioning method of claim 1, wherein the cloud is a virtual private network.

5. The rapid provisioning method of claim 1, further comprising halting copying of the blocks in response to a degradation of the connection to the cloud and resuming copying of the blocks upon reconnecting to the cloud.

6. A rapid provisioning method comprising:
    providing storage and processing services in a cloud for blocks of a virtual machine image;
    redirecting a boot path for the virtual machine image from a first path to a second path that includes a rapid provisioning extension; and
    in response to initiating booting of the virtual machine image in the cloud, modifying a particular transmission order that blocks of the virtual machine image are transferred to the cloud including arranging the blocks in a modified order based on each block's importance to the booting of the virtual machine image, and transferring the blocks of the virtual machine image to the cloud in the pre-modified particular transmission order after the virtual machine image completes booting.

7. The rapid provisioning method of claim 6, further comprising providing the blocks not already uploaded to cloud storage.

8. The rapid provisioning method of claim 6, further comprising communicating a request to cloud storage for blocks already uploaded.

9. The rapid provisioning method of claim 8, further comprising creating a map of blocks of the virtual machine image identifying blocks in cloud storage or on the customer computer.

10. The rapid provisioning method of claim 6, further comprising bypassing unused blocks of the virtual machine image.

11. The rapid provisioning method of claim 10, further comprising returning control to a hypervisor.

12. A computer program product embodied on a computer-readable medium, wherein the computer-readable medium does not comprise a signal and the computer program product further comprises:
    a first executable portion for connecting to a cloud;
    a second executable portion for copying blocks of a virtual machine image to the cloud, wherein the blocks are copied in a particular transmission order; and
    a third executable portion for initiating booting of the virtual machine image in the cloud; and
    a fourth executable portion for: in response to initiating booting of the virtual machine image in the cloud, continuing to copy blocks of the virtual machine image while the virtual machine image boots in the cloud, modifying the particular transmission order including arranging the blocks in a modified order based on each block's importance to the booting of the virtual machine image, and resuming copying the blocks of the virtual machine image to the cloud in the pre-modified particular transmission order after the virtual machine image completes booting.

13. A computer program product embodied on a computer-readable medium, wherein the computer-readable medium does not comprise a signal and the computer program product further comprises:
    a first executable portion for providing storage and processing services in a cloud for blocks of a virtual machine image;
    a second executable portion for redirecting a boot path for the virtual machine image from a first path to a second path that includes a rapid provisioning extension; and
    a third executable portion for: in response to initiating booting of the virtual machine image in the cloud, modifying a particular transmission order that blocks of the virtual machine image are transferred to the cloud including arranging the blocks in a modified order based on each block's importance to the booting of the virtual machine image, and transferring the blocks of the virtual machine image to the cloud in the pre-modified particular transmission order after the virtual machine image completes booting.

14. The computer program of claim 13, further comprising a fourth executable portion for providing the blocks not already uploaded to the hypervisor and to cloud storage.

15. The computer program of claim 14, further comprising a fifth executable portion for communicating a request to cloud storage for blocks already uploaded.

16. A rapid provisioning system for fulfilling a virtual machine image request from a rapid provisioning agent, the system comprising a processor and computer memory, the computer memory storing computer program instructions that, when executed by the computer processor, cause the system to further comprise:
    a hypervisor configured to manage operation of a virtual machine image resident on a cloud-based computer system, wherein the hypervisor is resident on the cloud-based computer system; and
    a rapid provisioning extension resident within the cloud-based computer system and connected in communication with the rapid provisioning agent;
    wherein the rapid provisioning extension is configured to receive a redirected boot path for the virtual machine image from the hypervisor and further configured to in response to initiating booting of the virtual machine image in the cloud, modifying a particular transmission order that blocks of the virtual machine image are transferred to the cloud including arranging the blocks in a modified order based on each block's importance to the booting of the virtual machine image, and transferring the blocks of the virtual machine image to the cloud in the pre-modified particular transmission order after the virtual machine image completes booting.

17. The rapid provisioning system of claim 16, wherein the rapid provisioning extension is further configured to provide the blocks not already uploaded to the hypervisor and to cloud storage.

18. The rapid provisioning system of claim 17, wherein the rapid provisioning extension is further configured to request blocks already uploaded from cloud storage.

* * * * *